(12) United States Patent
Hiramatsu (10) Patent No.: US 7,874,589 B2
(45) Date of Patent: Jan. 25, 2011

(54) SEAT BELT RETRACTOR

(75) Inventor: Koji Hiramatsu, Minato-ku (JP)

(73) Assignee: Takata Corporation, Tokyo (JP)

( * ) Notice: Subject to any disclaimer, the term of this patent is extended or adjusted under 35 U.S.C. 154(b) by 294 days.

(21) Appl. No.: 12/078,148

(22) Filed: Mar. 27, 2008

(65) Prior Publication Data
US 2008/0246267 A1 Oct. 9, 2008

(30) Foreign Application Priority Data
Mar. 28, 2007 (JP) .............................. 2007-083785

(51) Int. Cl.
B60R 22/28 (2006.01)
(52) U.S. Cl. ..................... 280/805; 242/379.1; 297/471
(58) Field of Classification Search ................. 280/806, 280/805; 242/379.1; 297/470–472
See application file for complete search history.

(56) References Cited

U.S. PATENT DOCUMENTS

| | | | |
|---|---|---|---|
| 6,416,008 B1 * | 7/2002 | Fujii et al. ................ | 242/379.1 |
| 6,676,058 B2 | 1/2004 | Nagata et al. | |
| 6,692,027 B2 * | 2/2004 | Siegfried et al. ............ | 280/805 |
| 6,969,089 B2 * | 11/2005 | Klingauf et al. ............. | 280/805 |
| 6,986,480 B2 * | 1/2006 | Blum et al. ............... | 242/379.1 |
| 7,240,924 B2 | 7/2007 | Kohlndorfer et al. | |
| 7,273,191 B2 * | 9/2007 | Clute et al. .............. | 242/379.1 |
| 7,278,600 B2 | 10/2007 | Inuzuka et al. | |
| 7,318,560 B2 * | 1/2008 | Clute ...................... | 242/379.1 |
| 7,384,014 B2 | 6/2008 | Ver Hoven et al. | |
| 7,416,151 B2 | 8/2008 | Mori et al. | |
| 7,431,119 B2 | 10/2008 | Tanaka | |
| 7,506,833 B2 | 3/2009 | Tanaka | |
| 7,571,873 B2 | 8/2009 | Takamatsu | |
| 2001/0006204 A1 | 7/2001 | Kajiyama | |
| 2002/0084646 A1 * | 7/2002 | Klingauf et al. ............. | 280/806 |
| 2006/0124795 A1 * | 6/2006 | Clute ......................... | 242/382 |

FOREIGN PATENT DOCUMENTS

| | | |
|---|---|---|
| EP | 1213195 B1 | 6/2002 |
| JP | 10-35411 | 2/2002 |

OTHER PUBLICATIONS

European Search Report issued by European Patent Office dated Aug. 13, 2009 for European Patent Application No. 08004482.9.

\* cited by examiner

*Primary Examiner*—Paul N Dickson
*Assistant Examiner*—Timothy D Wilhelm
(74) *Attorney, Agent, or Firm*—Foley & Lardner LLP (57) ABSTRACT

To further reduce variation in the maximum limited load by a seat belt load limiting mechanism composed of a torsion bar and a shearing member. When a spool rotates in the belt withdrawing direction relative to the locking base, energy absorbing (EA) mechanism action only by shear deformation of shear pins is first conducted so that the entire EA load is only the EA load by the shear pins. After the EA load by the shear pins becomes the maximum EA load, the seat belt is withdrawn by a predetermined amount and the EA action by torsional deformation of a torsion bar is conducted in addition to the EA action by the shear pins. Since the EA action only by the shear pins is first conducted, it is possible to reduce variation in the maximum limited load during the shear deformation of the shear pins.

7 Claims, 5 Drawing Sheets

PRESENT INVENTION

FIG. 5(a)

PRIOR ART

FIG. 5(b)

SEAT BELT RETRACTOR

BACKGROUND

The present application relates to a seat belt retractor, for retracting a seat belt such that the seat belt can be freely withdrawn and wound, in a seat belt apparatus installed in a vehicle.

More particularly, the present application relates to a seat belt retractor which comprises a seat belt load limiting mechanism for absorbing an occupant's kinetic energy to limit a load on a seat belt and prevent seat belt withdrawal in the event of an emergency such as a sudden stop or vehicle collision.

Traditionally, a seat belt apparatus installed in a vehicle, such as an automobile, restrains occupants in the event of an emergency situation as mentioned above. Such an apparatus is provided with a seat belt retractor that is used to coil the seat belt. The seat belt remains wound onto a spool when not in use and is withdrawn from the spool when the seat belt apparatus is required, i.e., to be worn by a vehicle occupant. The seat belt retractor has a locking mechanism which is activated in the event of an emergency to prevent the spool from rotating in the direction of seat belt withdrawal, preventing the retraction of the seat belt, and thereby securely restraining the occupant in the event of an emergency situation.

In the event of such an emergency situation, an occupant can be forced in a forward direction by inertia due to the deceleration of the vehicle thereby applying a load to the seat belt caused by the kinetic energy of the occupant. The load of the seat belt can then be transferred to the occupant as a force caused by the seat belt. It is desirable to reduce the force incurred by the occupant.

To reduce the force, a variety of seat belt retractors with seat belt load limiting mechanism have been developed. The seat belt load limiting mechanism comprises a torsion bar and a shear pin as a shearing member which are disposed between a spool for winding up a seat belt and a locking plate for locking the rotation of the spool in the belt withdrawing direction.

SUMMARY

According to a disclosed embodiment, a seat belt retractor is provided that includes a spool for winding up a seat belt and a locking mechanism having a locking member which is prevented from rotating in a belt withdrawing direction in the event of an emergency. The retractor further includes a seat belt load limiting mechanism for limiting load applied to the seat belt when the spool rotates relative to the locking member. The load limiting mechanism includes a torsion bar which rotationally connects the spool and the locking member and is torsionally deformable when the spool rotates relative to the locking member. The load limiting mechanism further includes a shearing member which is disposed to extend both in the spool and the locking member and is shear-deformable when the spool rotates relative to the locking member.

The retractor is configured so that the limited load characteristics of the seat belt load limiting mechanism is set such that the limited load is first the load limited only by shear deformation of the shearing member when the spool rotates relative to the locking member, and the limited load by torsional deformation of the torsion bar is added after the limited load by the shearing member becomes the maximum limited load.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

The seat belt load limiting mechanism disclosed herein is composed of an energy absorbing mechanism (hereinafter referred to as "EA mechanism") which absorbs kinetic energy from an occupant wearing a seat belt by torsional deformation of the torsion bar and the shear deformation of the shear pin when rotation is generated between the spool and the locking plate in the event of an emergency. The kinetic energy of the occupant is absorbed by the EA mechanism, thereby limiting the load on the seat belt. The load reduced by energy absorption of the EA mechanism is an EA load which is a limited load indicating the limited amount of load acting on the seat belt.

The deformation of the torsion bar and shear pin occur at the same time when a rotation is generated between the spool and the locking plate. Accordingly, since the maximum EA load of the EA mechanism composed of the torsion bar and the shear pin is a combination of the EA load by the torsion bar and the EA load by the shear pin, there may be variation in the maximum EA load.

The present disclosure is based under the aforementioned circumstances and discloses a seat belt retractor which can further reduce variation in the maximum load limited by a seat belt load limiting mechanism composed of a torsion bar and a shearing member and to provide a seat belt apparatus employing the seat belt retractor.

In an exemplary embodiment, a seat belt retractor comprises at least a spool for winding up a seat belt, a locking mechanism having a locking member which is prevented from rotating in a belt withdrawing direction in the event of an emergency, and a seat belt load limiting mechanism for limiting load applied to the seat belt when the spool rotates relative to the locking member, wherein the seat belt load limiting mechanism comprises a torsion bar which rotationally connects the spool and the locking member and is torsionally deformable when the spool rotates relative to the locking member, and a shearing member which is disposed to extend both in the spool and the locking member and is shear-deformable when the spool rotates relative to the locking member, and is characterized in that the limited load characteristics of the seat belt load limiting mechanism is set such that the limited load is first the load limited only by shear deformation of the shearing member when the spool rotates relative to the locking member, and the limited load by torsional deformation of the torsion bar is added after the limited load by the shearing member becomes the maximum limited load.

A seat belt retractor is characterized in that an idle angle is set between the spool and the torsion bar, wherein the idle angle is an angle by which the spool idly rotates relative to the torsion bar when the spool starts to rotate relative to the locking member so that, after the spool idly rotates, the spool is rotationally connected to the torsion bar. Further, a seat belt retractor is characterized in that the shearing member may be a shear pin.

In an exemplary embodiment, a seat belt apparatus includes a seat belt for restraining an occupant; a seat belt retractor which winds up the seat belt and allows the seat belt to be withdrawn and is actuated in the event of an emergency to block the withdrawal of the seat belt; a tongue slidably supported by the seat belt; and a buckle which is fixed to a vehicle floor or a vehicle seat which the tongue can be detachably latched.

According to the seat belt retractor of the present disclosure having the aforementioned structure, the limited load characteristics of the seat belt load limiting mechanism is set such that the limited load is first the load limited only by shear deformation of the shearing member when the spool rotates relative to the locking member, and the limited load by torsional deformation of the torsion bar is added after the limited load by the shearing member becomes the maximum limited load. Therefore, the maximum limited load by the seat belt load limiting mechanism can be composed of only the maximum limited load by the shearing member. This can reduce the variation in the maximum limited load during the operation of the seat belt load limiting mechanism.

An idle angle by which the spool idly rotates relative to the torsion bar is set between the spool and the torsion bar. Therefore, the limited load characteristics of the seat belt load limiting mechanism can be achieved by simple structure and the seat belt load limiting mechanism can be easily and inexpensively manufactured with slight design change without significant design change of a seat belt load limiting mechanism of a conventional seat belt retractor.

The shearing member has simple structure using an inexpensive shear pin. Therefore, the seat belt load limiting mechanism can be further easily and inexpensively manufactured.

The seat belt apparatus employs the seat belt retractor of the present disclosure, it is possible to reduce variation in the limited load during the operation of the seat belt load limiting mechanism, thereby achieving the restraint of an occupant by the seat belt in the event of an emergency with smaller restraining force.

Figure 1:
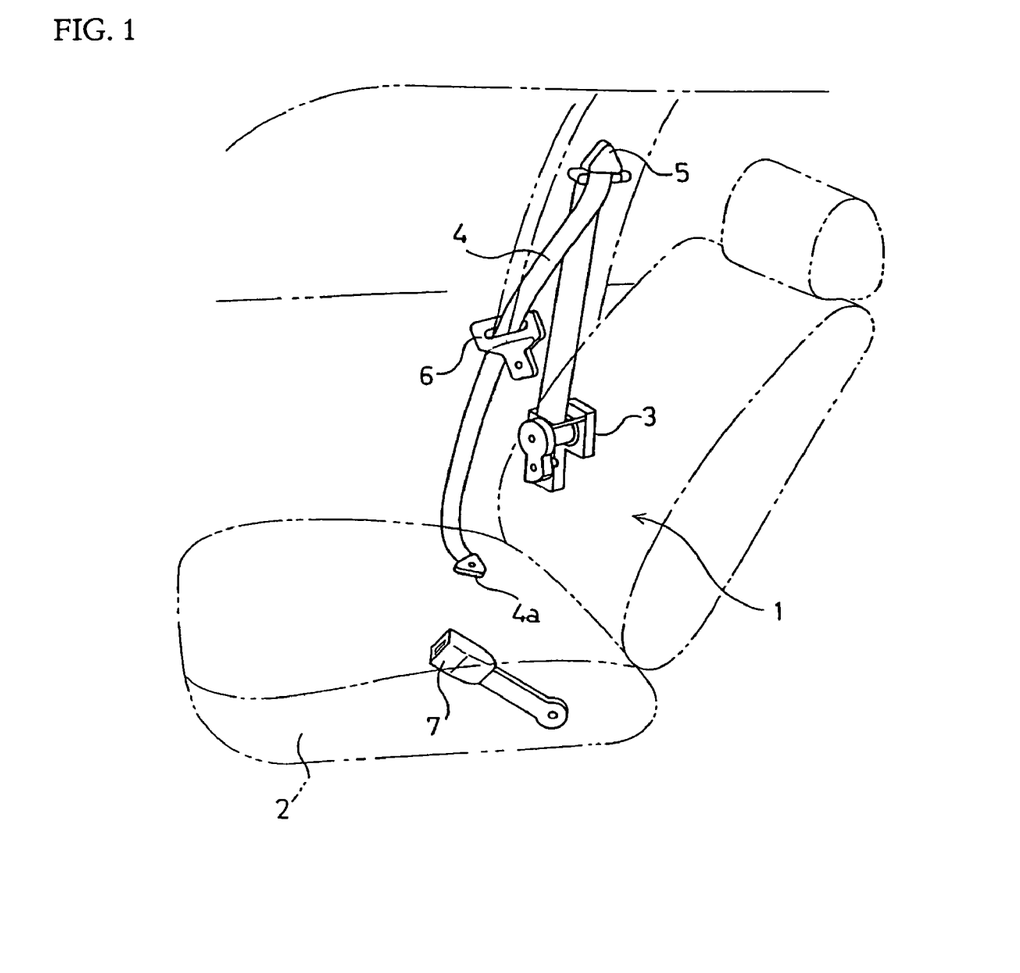
FIG. 1 is a perspective view of a seat belt apparatus comprising a seat belt retractor.

As shown in FIG. 1, the seat belt apparatus 1 of this embodiment comprises, similarly to a conventionally known seat belt apparatus of a three-point type using a seat belt retractor, a seat belt retractor 3 which is fixed to a vehicle body near a vehicle seat 2, a seat belt 4 which is withdrawn from the seat belt retractor 3 and is provided at its end with a belt anchor 4a fixed to a vehicle floor or the vehicle seat 2, a deflection fitting 5 for guiding the seat belt 4 withdrawn from the seat belt retractor 3 toward an occupant's shoulder, a tongue 6 which is slidably supported by the seat belt 4 guided by and extending from the deflection fitting 5, and a buckle 7 which is fixed to the vehicle floor or the vehicle seat 2 and to which the tongue 6 can be inserted and detachably latched.

Figure 2:
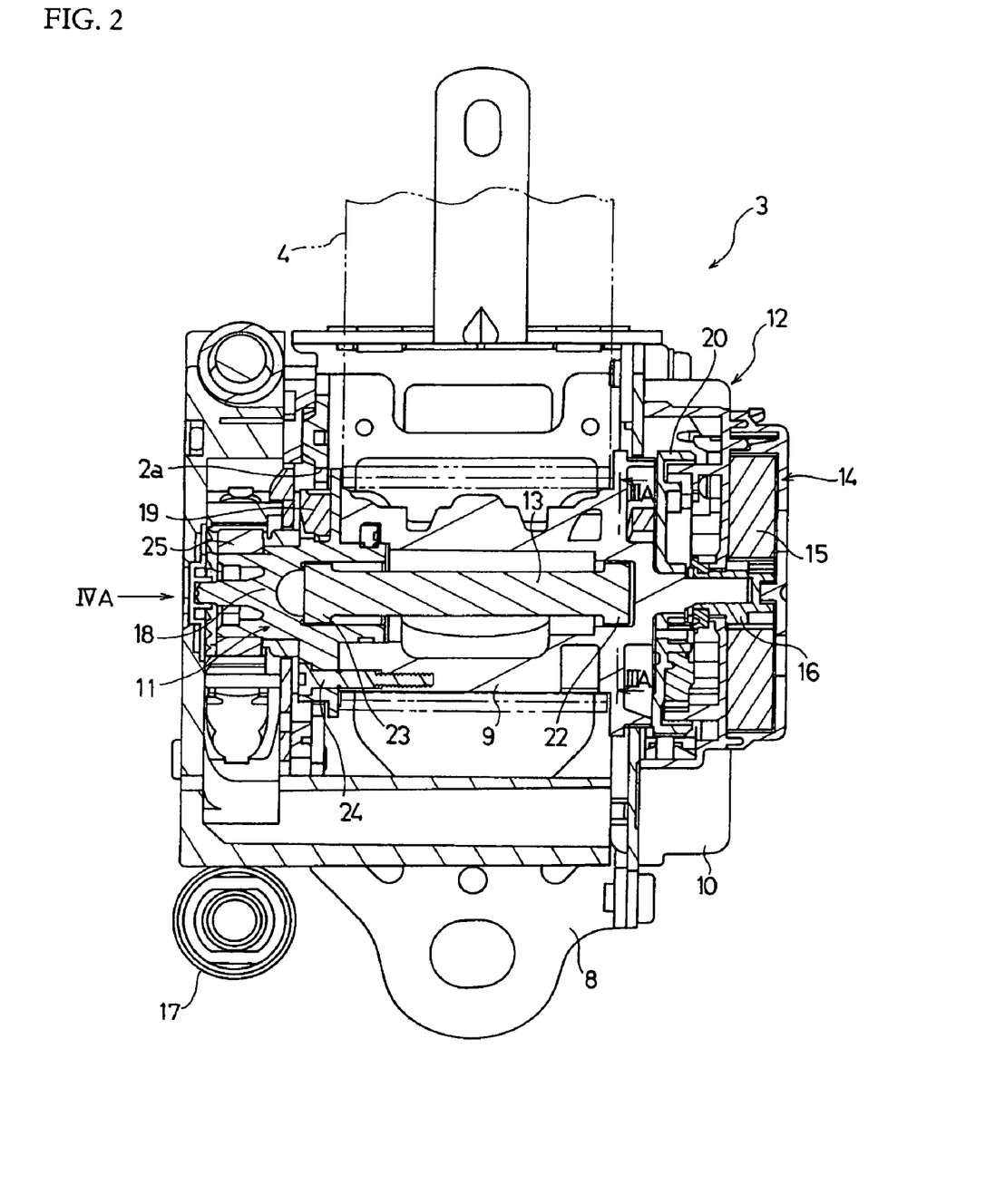
FIG. 2 is a vertical sectional view of the seat belt retractor illustrated in FIG. 1.

Illustrated in FIG. 2 is the seat belt retractor 3, a U-like frame 8, a seat belt 4, a spool 9 which is rotatably supported between the side walls of the U-like frame 8 and on which the seat belt 4 is wound, a deceleration sensing mechanism 10 which senses a large vehicle deceleration generated in the event of an emergency as mentioned above and is thus actuated, a locking mechanism 11 which prevents the spool 9 from rotating in the belt withdrawing direction during operation, a lock actuation control mechanism 12 which is actuated by the deceleration sensing mechanism 10 to control the operation of the locking mechanism 11, a torsion bar 13 which is fitted in the center of the spool 9 with some looseness to extend in the axial direction and rotationally connects the spool 9 and the locking mechanism 11, a spring mechanism 14 which always biases the spool 9 in the belt winding direction via a bush 16 by spring force of a spiral spring 15, and a pretensioner 17 which is actuated in the event of an emergency as mentioned above to generate belt winding torque.

Since the actions of the basic components of the seat belt retractor 3 are the same as the actions of the basic components of the conventionally known typical seat belt retractor, the detailed description about the actions will be omitted.

As shown in FIG. 2, the locking mechanism 11 is disposed on a side (the left side in FIG. 2) of the spool 9 opposite the lock actuation control mechanism 12 (In the conventionally known typical seat belt retractor, the locking mechanism 11 is often disposed on the same side of the spool as the lock actuation control mechanism 12). The locking mechanism 11 comprises a locking base or locking member 18 which is disposed rotatably relative to the spool 9 and a pawl 19 pivotally supported by the locking base 18.

The lock actuation control mechanism 12 comprises a lock gear 20 which is supported by the spool 9. The lock gear 20 normally rotates together with the spool 9, but is stopped by the operation of the deceleration sensing mechanism 10 to generate a rotational difference relative to the spool 9 in the event of an emergency.

Figure 4A:
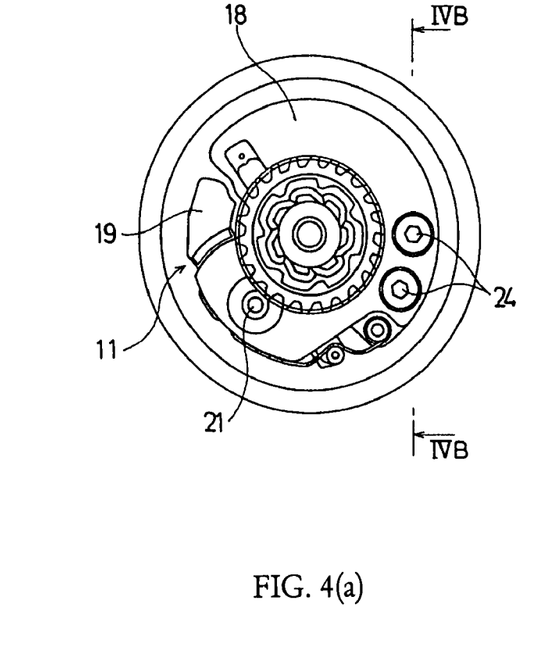
FIG. 4(a) is an illustration showing the installation state of shear pins as seen from IVA in FIG. 2 and with a pretensioner being omitted.

By the rotational difference of the lock gear 20 of the lock actuation control mechanism 12 relative to the spool 9 in the event of an emergency, a pawl 19 of the locking mechanism 11 is actuated via a control transmitting member 21 (shown in FIG. 4(a)) penetrating the spool 9 in the axial direction. Accordingly, the pawl 19 is engaged with one of internal teeth 2a of the frame 8 so as to lock the rotation of the spool 9 in the belt withdrawing direction β.

The torsion bar 13 is torsionally deformed by generation of the relative rotation between the spool 9 and the locking base 18 so as to perform energy absorption (EA) for absorbing the energy applied on the seat belt 4 by the inertial movement of the occupant. Because of the EA load of the EA mechanism by the torsional deformation of the torsion bar 13, the load applied to the occupant by the seat belt 4 is reduced.

The torsion bar 13 has a first torque transmitting portion 22 which is formed at the spool 9 side end (the right side in FIG. 2) thereof and a second torque transmitting portion 23 which is formed at the locking base 18 side end (the left side in FIG. 2) thereof.

Figure 3A:
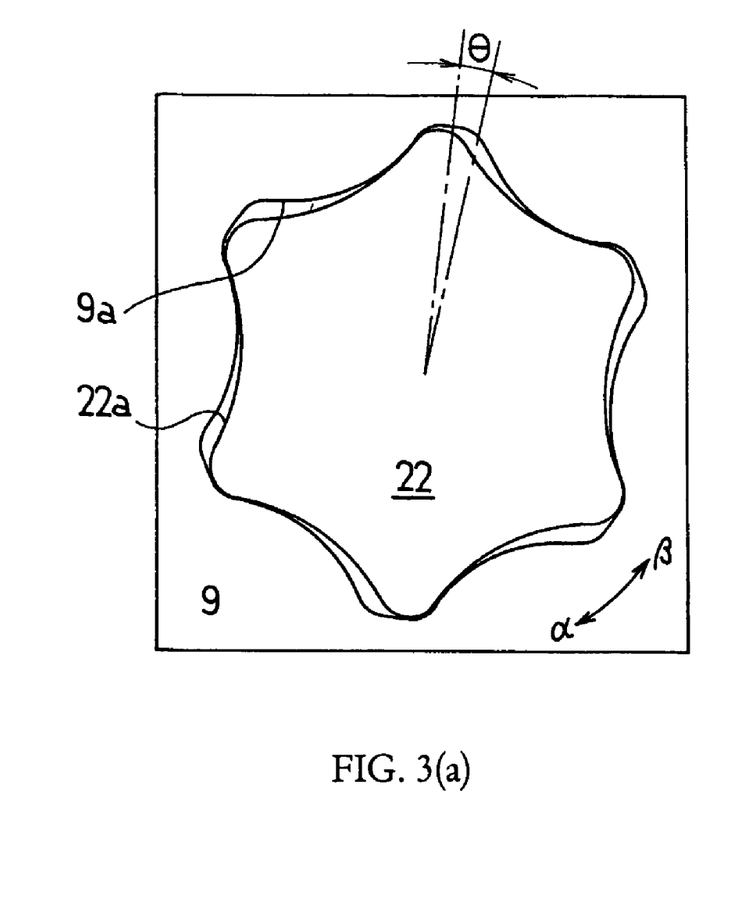
FIG. 3(a) is a sectional view taken along a line IIIA-IIIA in FIG. 2 illustrating the relation between a spool and a torsion bar in the normal state.

As shown in FIG. 3(a), the first torque transmitting portion 22 of the torsion bar 13 is fitted in a concavity 9a formed in the spool 9. In this case, the concavity 9a is formed in a regular hexagonal shape in its cross section. All corners of the hexagonal shape of the concavity 9a are rounded to be round corners and all sides between the corners are curved to dent inward. The first torque transmitting portion 22 is formed in a regular hexagonal shape in its cross section which is slightly smaller than the hexagonal shape of the concavity 9a. All corners of the hexagonal shape of the first torque transmitting portion 22 are also rounded to be round corners and all sides between the corners are also curved to dent inward.

Figure 3B:
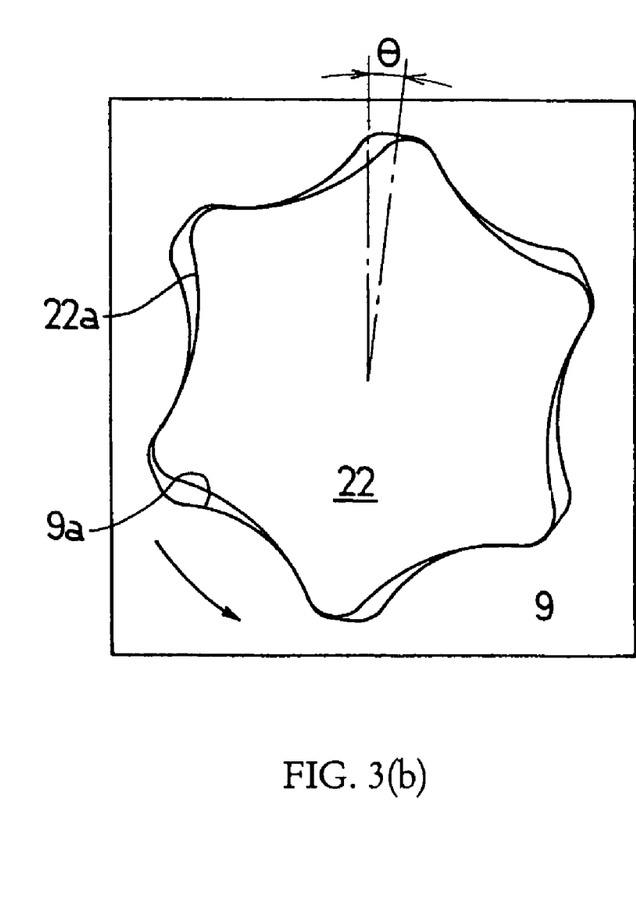
FIG. 3(b) is a sectional view similar to FIG. 3(a), illustrating relation between the spool and the torsion bar in the event of an emergency.

Therefore, as shown in FIGS. 3(a) and 3(b), the spool 9 and the torsion bar 13 can rotate relative to each other only by an angle θ when the first torque transmitting portion 22 is fitted in the concavity 9a. Normally, as shown in FIG. 3(a), the inner surface of the concavity 9a is in contact with the outer surface 22a of the first torque transmitting portion 22 in the belt winding direction a so that the spool 9 and the first torque transmitting portion 22 of the torsion bar 13 are maintained in a state where they are connected rotationally in the belt winding direction α.

As the locking mechanism 11 is actuated in the event of an emergency, the spool 9 rotates relative to the torsion bar 13. As the spool 9 rotates relative to the torsion bar 13 by the angle θ, the inner surface of the concavity 9a comes in contact with the outer surface 22a of the first torque transmitting portion 22 in the belt withdrawing direction β so that the spool 9 and the first torque transmitting portion 22 of the torsion bar 13 are set in a state where they are connected rotationally in the belt withdrawing direction β as shown in FIG. 3(b). After that, the spool 9 and the torsion bar 13 rotate together in the belt withdrawing direction β. In this manner, during the operation of the locking mechanism 11, the spool 9 idly rotates relative to the torsion bar 13 in the belt withdrawing direction β by the angle θ. The setting of the idle angle θ of the spool 9 relative to the torsion bar 13 will be described later.

On the other hand, the second torque transmitting portion 23 of the torsion bar 13 is fitted in a concavity 18a which is formed in the locking base 18 to have a regular hexagonal shape in its cross section. In this case, the second torque transmitting portion 23 is also formed in a regular hexagonal shape in its cross section. The hexagonal shapes of the concavity 18a and the second torque transmitting portion 23 are substantially the same in size. Therefore, in the state where the second torque transmitting portion 23 is fitted in the concavity 18a, the locking base 18 and the torsion bar 13 can always rotate together.

In addition to the EA mechanism composed of the torsion bar 13, the seat belt retractor 3 of this embodiment comprises a second EA mechanism composed of a shear pin as a shearing member. As shown in FIG. 2 and FIG. 4(a), there are a pair of shear pins 24 disposed between the spool 9 and the locking base 18. These shear pins 24 are spaced from each other by predetermined distance in the circumferential direction and are positioned on a circle of which axis is the same as the rotational axis of the spool 9. The shear pins 24 are the same ones and extend in the same direction as the axial direction of the spool 9. Though the two shear pins 24 are provided in the illustrative example, a predetermined number of, more than one, shear pins may be provided. In case that a plurality of shear pins are provided, it is preferable that the shear pins are disposed on a same circle and equally spaced.

Figure 4B:
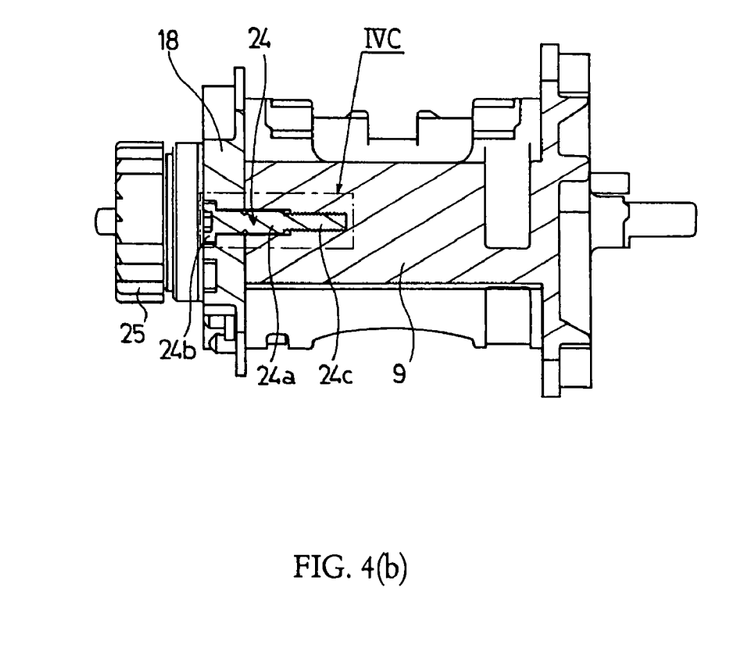
FIG. 4(b) is a sectional view taken along IVB-IVB in FIG. 4(a).
Figure 4C:
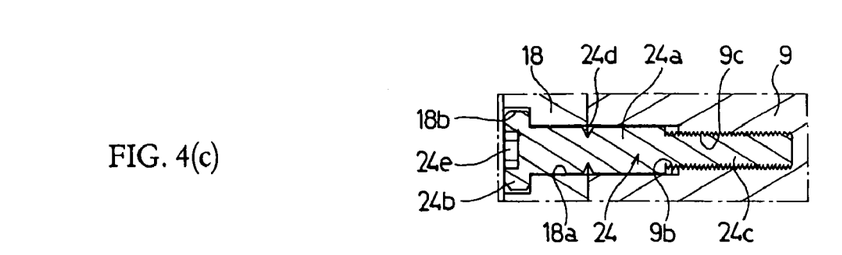
FIG. 4(c) is an enlarged view of portion IVC in FIG. 4(b).

As shown in FIGS. 4(b) and 4(c), each shear pin 24 comprises a shaft portion 24a, a head portion 24b formed at an end portion (the left side in FIGS. 4(b) and 4(c)) of the shaft portion 24a, and an external threaded portion 24c formed at the other end portion (the right side in FIGS. 4(b) and 4(c)). In this case, the head portion 24b is formed to have a diameter larger than that of the shaft portion 24a and the external threaded portion 24c is formed to have an outer diameter which is smaller than the outer diameter of the shaft portion 24a.

Formed in the outer periphery of the shaft portion 24a of the shear pin 24 is an annular notch groove 24d having a V-like shape in its section. Further, the head portion 24b has a slot 24e formed therein to which a tool such as a screwdriver (not shown) is fitted to turn the shear pin 24.

The spool 9 and the locking base 18 are provided with axial holes 9b, 18a formed therein, respectively, into which the shaft portion 24a of the shear pin 24 is substantially tightly fitted. The axial holes 9b, 18a are aligned to extend in the axial direction. The spool 9 has an internal threaded portion 9c formed to extend rightward from the axial hole 9b, into which the external threaded portion 24c of the shear pin 24 is screwed.

The locking base 18 is arranged relative to the spool 9 such that the axial holes 9b, 18a are aligned. The shear pin 24 is inserted from the side the locking base 18 into the axial holes 9b, 18a in the axial direction. Further, the tool is fitted in the slot 24e and the shear pin 24 is turned by the tool, whereby the external threaded portion 24c is screwed into and fixed to the internal threaded portion 9c. Therefore, the shear pin 24 is securely attached between the spool 9 and the locking base 18.

In the state that the shear pin 24 is attached to the spool 9 and the locking base 18, the locking base 18 is in press contact with the spool 9 in the axial direction substantially tightly and the axial position of the notch groove 24d of the shear pin 24 is substantially coincide with the position of the contact portion (boundary) between the spool 9 and the locking base 18 as shown in FIG. 4(c).

The shear pin 24 is sheared at the notch groove 24d when a shearing load more than a predetermined shearing load is applied. Since the EA load is set by adding the EA load by this shear fracture to the EA load by torsional deformation of the torsion bar 13, the EA load of the EA mechanism can be increased.

As mentioned above, in the seat belt retractor 3 of this embodiment, the EA mechanism is composed of the EA mechanism by the torsion bar 13 and the EA mechanism by the shear pins 24.

In the seat belt retractor 3 of this embodiment, when a relative rotation is generated between the spool 9 and the locking base 18 by the operation of the locking mechanism 11 in the event of an emergency, the EA action by the shear fracture of the shear pins 24 is first performed and, during this EA action, the EA action of the torsion bar 13 is started. For this, the spool 9 is adapted to idly rotate relative to the torsion bar 13 in the belt withdrawing direction β at an initial stage of the relative rotation between the spool 9 and the locking base 18. That is, the aforementioned idle angle θ of the spool 9 relative to the torsion bar 13 is set.

Figure 5A:
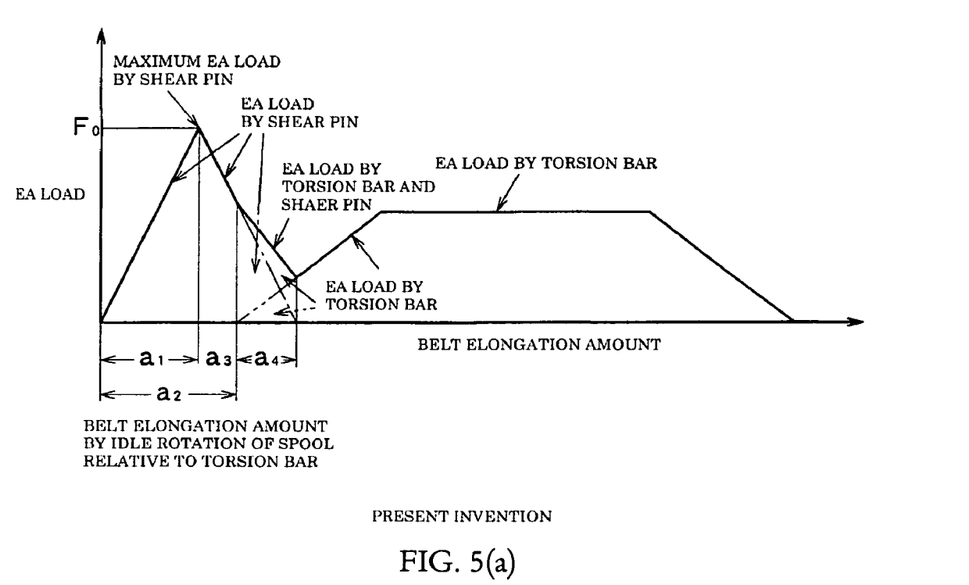
FIG. 5(a) is a graph illustrating EA load in the seat belt retractor.
Figure 5B:
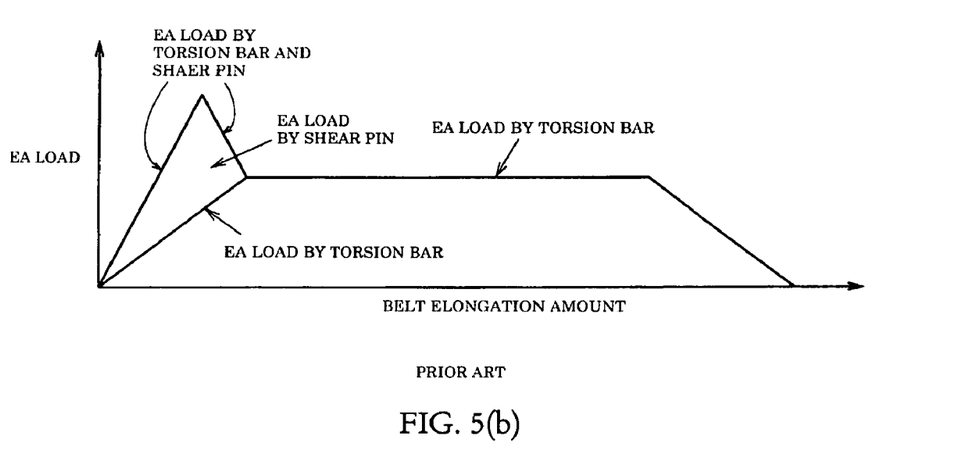
FIG. 5(b) is a graph illustrating EA load in a conventional seat belt retractor.

The idle angle θ is set as follows. First, the start of the EA action by the torsion bar 13 will be described. As shown in FIG. 5(a), the EA action by the shear pins 24 is started by elongation (withdrawal) of the seat belt 4 after the rotation of the locking base 18 is stopped by the operation of the locking mechanism 11. The belt elongation amount when the EA load by the shear pins 24 becomes the maximum EA load $F_0$ is set to a belt elongation amount $a_1$. The EA action by the torsion bar 13 is started when the belt elongation amount becomes a belt elongation amount $a_2$ exceeding the belt elongation amount $a_1$. The belt elongation amount $a_2$ is an amount obtained by adding a belt elongation amount $a_3$ to the belt elongation amount $a_1$ for the maximum EA load $F_0$ and is smaller by a predetermined belt elongation amount $a_4$ than a belt elongation amount when the EA action by the shear pins 24 is terminated because the shear pins 24 are sheared. That is, the idle angle θ of the spool 9 relative to the torsion bar 13 is set to be an angle corresponding to the belt elongation amount $a_2$ at the start of the EA action by the torsion bar 13.

The respective actions of the seat belt retractor 3 and the seat belt apparatus 1 for normal wearing of the seat belt 4 and normal canceling of the wearing of the seat belt 4 are the same as those of conventionally known typical seat belt retractor and seat belt apparatus.

That is, when the seat belt 4 is not used, the seat belt 4 is fully wound up because of the biasing force of the spring mechanism 14. By withdrawing the seat belt 4 at a normal speed for wearing, the spool 9 rotates in the seat belt withdrawing direction so that the seat belt 4 is smoothly withdrawn. After the tongue 6 is inserted into and latched with the buckle 7, an excessively withdrawn part of the seat belt 4 is wound onto the spool 9 by the biasing force of the spring mechanism 14 so that the seat belt 4 is fitted to the occupant to the extent that the occupant does not feel stress. In this manner, the seat belt 4 is worn.

By canceling the latch between the tongue 6 and the buckle 7 for canceling the wearing of the seat belt 4, the withdrawn seat belt 4 is fully wound onto the spool 9 by the biasing force of the spring mechanism 14.

In the normal wearing action and the normal canceling action of the seat belt 4, the locking base 18 of the locking mechanism 11, the lock gear 20 of the lock actuation control mechanism 12, and the torsion bar 13 all rotate together with the spool 9. Therefore, the torsion bar 13 is not deformed. Also in the normal wearing action and the normal canceling action, the state shown in FIG. 3(a) that the spool 9 is in contact with the first torque transmitting portion 22 of the torsion bar 13 in the belt winding direction α is maintained and no shearing load acts on the shear pins 24.

In the event of an emergency when the seat belt is worn, the pretensioner 17 is actuated to generate a seat belt winding torque. The seat belt winding torque is transmitted to the spool 9 via the pinion 25 and the locking base 18 so that the spool 9 winds up a predetermined amount of the seat belt 4 to restrain the occupant. After that, since the seat belt 4 is about to be withdrawn because of inertial forward movement of the occupant, the spool 9 is about to rotate in the belt withdrawing direction β. On the other hand, the deceleration sensing mechanism 10 is activated at a large vehicle deceleration generated in the event of an emergency so as to stop the rotation of the lock gear 20 of the lock actuation control mechanism 12 in the belt withdrawing direction β. Then, relative rotation is generated between the spool 9 and the lock gear 20 so that the pawl 19 is actuated to engage one of the internal teeth 2a of the frame 2. Accordingly, the rotation of the locking base 18 in the belt withdrawing direction β is stopped. By the stop of the rotation of the locking base 18, the rotation of the torsion bar 13 in the belt withdrawing direction β is also stopped.

Then, since only the spool 9 tries to further rotate in the belt withdrawing direction β, the spool 9 tries to rotate relative to the locking base 18. Accordingly, the shearing load acts on the shear pins 24 so that the shear pins 24 start shear deformation, thereby allowing the relative rotation of the spool 9 relative to the locking base 18 in the belt withdrawing direction β.

Even though the shear pins 24 are pulled in a direction of coming off the axial holes 9b of the spool 9 (leftward in FIGS. 4(b) and 4(c)) because of the shearing load acting on the shear pins 24, the shear pins 24 are prevented from moving relative to the spool 9 in the direction coming off the axial holes 9b because the external threaded portions 24c of the shear pins 24 are screwed into and connected to the internal threaded portions 9c of the spool 9. Therefore, the portions of the locking base 18 where the shear pins 24 are installed are prevented from being spaced apart from the spool 9 and thus from being inclined. Accordingly, little bending load acts on the shear pins 24 so that substantially only shearing load acts on the shear pins 24. In addition, since the spool 9 is not in contact with the first torque transmitting portion 22 in the belt withdrawing direction β, the spool 9 idly rotates relative to the first torque transmitting portion 22. That is, no torsional load is applied to the torsion bar 13.

At the start of and in the initial stage of EA action in the seat belt retractor 3, EA action only by the shear deformation of the shear pins 24 is performed. The EA load during this is EA load only by shear pins 24 as shown in FIG. 5(a) and the EA load is gradually increased according to the belt withdrawing (belt elongation) amount withdrawn or elongated by the occupant's inertia. While the spool 9 idly rotates relative to the first torque transmitting portion 22, the EA load by the shear pins 24 becomes the maximum EA load $F_0$ and, after that, the EA load by the shear pins 24 is gradually decreased.

Before the shear pins 24 are sheared, the spool 9 idly rotates relative to the first torque transmitting portion 22 by an idle angle θ and comes in contact with the first torque transmitting portion 22 of the torsion bar 13 in the belt withdrawing direction β as shown in FIG. 3(b). By this contact, the idle rotation of the spool 9 relative to the first torque transmitting portion 22 ends. Then, torsional load acts on the torsion bar 13 so that the torsion bar 13 is deformed and the spool 9 and the first torque transmitting portion 22 rotate together in the belt withdrawing direction β. Therefore, EA action by torsional deformation of the torsion bar 13 is performed in addition to the EA action by the shear deformation of the shear pins 24 as shown in FIG. 5(a). The EA load during this is a total of the EA load by the shear pins 24 and the EA load by the torsion bar 13 as shown in FIG. 5(a).

As the shear pins 24 are sheared, the EA action by the shear pins 24 ends and the EA action only by the torsion bar 13 is performed as shown in FIG. 5(a). Therefore, the EA load by the shear pins 24 goes out and only the EA load by the torsion bar 13 exists. As the torsional deformation of the torsion bar 13 exceeds a certain amount as shown in FIG. 5(a), the EA load by the torsional deformation of the torsion bar 13 becomes constant. In this manner, in the seat belt retractor 3 of this embodiment, the load applied on the seat belt 4 is limited by the aforementioned respective EA loads to absorb impact applied to the occupant.

As mentioned above, in the seat belt retractor 3 of this embodiment, the EA mechanism has EA load characteristics in which only the EA load by the shear deformation of the shear pins 24 first acts when the spool 9 rotates relative to the locking base 18, and the EA load by torsional deformation of the torsion bar 13 is added after the EA load by the shear pins 24 becomes the maximum EA load.

During the EA action by the torsion bar 13, that is, during impact absorption with constant EA load by the torsional deformation of the torsion bar 13, the inertial movement of the occupant ends.

According to the seat belt retractor 3 of this embodiment, the EA load characteristics of the EA mechanism are set such that only the EA load by the shear deformation of the shear pins 24 first acts when the spool 9 rotates relative to the locking base 18, and the EA load by torsional deformation of the torsion bar 13 is added after the EA load by the shear pins 24 becomes the maximum EA load. Therefore, the maximum EA load of the EA mechanism can be set to the maximum EA load only by the shear pins. This reduces variation in the maximum EA load during the operation of the EA mechanism.

Since the idle angle θ by which the spool 9 idly rotates relative to the torsion bar 13 is set between the spool 9 and the torsion bar 13, the EA load characteristics of the EA mechanism can be achieved by simple structure and the EA mechanism can be easily and inexpensively manufactured with slight design change without significant design change of an EA mechanism of a conventional seat belt retractor.

Since the mechanism has simple structure using inexpensive shear pins, the EA mechanism can be further easily and inexpensively manufactured.

Since the shear pins 24 are connected to the spool 9 by screwing, the shear pins 24 are securely fixed to the spool 9. Therefore, even though pulling force is applied to the shear pins 24 in a direction of coming off the spool 9 when the spool 9 rotates relative to the locking base 18, the shear pins 24 are prevented from moving in a direction of coming off the spool 9. This prevents the portions of the locking base 18, where the shear pins 24 are installed, from being spaced apart from the spool 9 and thus prevents the locking base 18 from being inclined. Accordingly, no bending load acts on the shear pins 24 so that substantially only shearing load acts on the shear pins 24. Therefore, the load limiting action of the shear pins 24 is conducted substantially only by shear deformation.

Since the seat belt apparatus 1 of this embodiment employs the seat belt retractor 3 of this embodiment, it is possible to reduce variation in the EA load during the operation of the EA mechanism and to conduct the load limiting action of the shear pins 24 substantially only with the shear deformation, thereby achieving the restraint of the occupant by the seat belt 4 in the event of an emergency with smaller restraining force.

Though the torsional deformation of the torsion bar 13 is set to start after the EA load by the shear pins 24 becomes the maximum EA load in the aforementioned embodiment, the present invention is not limited thereto. For example, the torsional deformation of the torsion bar 13 may be set to start simultaneously with when the EA load by the shear pins 24 becomes the maximum EA load. Alternatively, the torsional deformation of the torsion bar 13 may be set to start after the shear pins 24 are sheared. It is possible whenever the torsional deformation of the torsion bar 13 is set to start simultaneously with or after the EA load by the shear pins 24 becomes the maximum EA load. That is, the start of the torsional deformation of the torsion bar 13 may be set based on the maximum EA load by the shear pins 24.

The disclosed seat belt retractor and the seat belt apparatus may be suitably used as a seat belt retractor provided with an energy absorbing mechanism comprising a torsion bar and a shearing member, and a seat belt apparatus employing the seat belt retractor. The torsion bar is torsionally deformed and the shearing member is shear-deformed at the time of preventing the seat belt from being withdrawn by inertia of an occupant in the event of an emergency such as a collision when the occupant wears a seat belt, thereby absorbing kinetic energy of the occupant and thus limiting load applied to the seat belt.

The priority application, Japanese patent application no. 2007-083785, filed Mar. 28, 2007 including the specification, drawings, claims and abstract, is incorporated herein by reference in its entirety.

It is important to note that the arrangement of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt retractor comprising:
   at least one spool for winding up a seat belt,
   a locking mechanism having a locking member which is prevented from rotating in a belt withdrawing direction in an event of an emergency, and
   a seat belt load limiting mechanism for limiting load applied to the seat belt when the spool rotates relative to the locking member,
   wherein the seat belt load limiting mechanism comprises a torsion bar which rotationally connects the spool and the locking member and is torsionally deformable when the spool rotates relative to the locking member, and a shearing member which is disposed to extend both in the spool and the locking member and is shear-deformable when the spool rotates relative to the locking member,
   wherein limited load characteristics of the seat belt load limiting mechanism are set such that a limited load is first a load limited only by shear deformation of the shearing member when the spool rotates relative to the locking member, and a load limited by torsional deformation of the torsion bar is added to the load limited by the shearing member after the load limited by the shearing member becomes a maximum limited load.

2. A seat belt retractor as claimed in claim 1, wherein an idle angle is set between the spool and the torsion bar, wherein the idle angle is an angle by which the spool idly rotates relative to the torsion bar when the spool starts to rotate relative to the locking member so that, after the spool idly rotates, the spool is rotationally connected to the torsion bar.

3. A seat belt retractor as claimed in claim 1, wherein the shearing member is a shear pin.

4. A seat belt apparatus comprising:
   at least a seat belt for restraining an occupant;
   a seat belt retractor which winds up the seat belt and allows the seat belt to be withdrawn and is actuated in an event of an emergency so as to block the withdrawal of the seat belt;
   a tongue slidably supported by the seat belt; and
   a buckle which is fixed to a vehicle floor or a vehicle seat and to which the tongue can be detachably latched,
   wherein the seat belt retractor includes at least one spool for winding up the seat belt, a locking mechanism having a locking member which is prevented from rotating in a belt withdrawing direction in the event of the emergency, and a seat belt load limiting mechanism,
   wherein the seat belt load limiting mechanism comprises a torsion bar which rotationally connects the spool and the locking member and is torsionally deformable when the spool rotates relative to the locking member, and a shearing member which is disposed to extend both in the spool and the locking member and is shear-deformable when the spool rotates relative to the locking member, wherein limited load characteristics of the seat belt load limiting mechanism are set such that a limited load is first a load limited only by shear deformation of the shearing member when the spool rotates relative to the locking member, and a load limited by torsional deformation of the torsion bar is added to the load limited by the shearing member after the load limited by the shearing member becomes a maximum limited load.

5. A seat belt apparatus as claimed in claim 4, wherein an idle angle is set between the spool and the torsion bar, wherein the idle angle is an angle by which the spool idly rotates relative to the torsion bar when the spool starts to rotate relative to the locking member so that, after the spool idly rotates, the spool is rotationally connected to the torsion bar.

6. A seat belt apparatus as claimed in claim 4, wherein the shearing member is a shear pin.

7. A seat belt retractor comprising:

a spool for winding up a seat belt;

a locking mechanism having a locking member which is prevented from rotating in a belt withdrawing direction in an event of an emergency; and a seat belt load limiting mechanism comprising a torsion bar which rotationally connects the spool and the locking member and is torsionally deformable when the spool rotates relative to the locking member, and a shearing member which is disposed to extend both in the spool and the locking member and is shear-deformable when the spool rotates relative to the locking member, wherein the seat belt load limiting mechanism is configured so that, when the spool rotates relative to the locking member, a limited load is a load limited only by shear deformation of the shearing member, and after the load limited due to shear deformation of the shearing member reaches a maximum value the limited load includes a load resulting from torsional deformation of the torsion bar added to the load limited due to the shear deformation of the shearing member.

* * * * *